United States Patent
Caminschi (10) Patent No.: US 7,340,605 B2
(45) Date of Patent: Mar. 4, 2008

(54) SYSTEM AND METHOD FOR SECURE DOWNLOAD OF WAVEFORMS TO SIGNAL GENERATORS

(75) Inventor: Andrew Caminschi, Santa Rosa, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1183 days.

(21) Appl. No.: 10/001,581

(22) Filed: Oct. 31, 2001

(65) Prior Publication Data

US 2003/0081768 A1    May 1, 2003

(51) Int. Cl.
*H04L 9/00* (2006.01)
*G06F 7/04* (2006.01)
*H04K 1/00* (2006.01)

(52) U.S. Cl. .................. 713/168; 713/182; 726/4; 726/17; 726/27; 380/2

(58) Field of Classification Search .................. 713/168
See application file for complete search history.

(56) References Cited

U.S. PATENT DOCUMENTS 5,963,566 A * 10/1999 Rajsuman et al. .......... 714/733
6,468,160 B2 * 10/2002 Eliott .......................... 463/43
6,557,103 B1 * 4/2003 Boncelet et al. ............ 713/176
6,560,285 B1 * 5/2003 Reitmeier et al. ...... 375/240.16
6,587,842 B1 * 7/2003 Watts ........................... 705/57
7,031,946 B1 * 4/2006 Tamai et al. ................. 705/67
2007/0162743 A1 * 7/2007 Steinberg et al. ........... 713/156

* cited by examiner

*Primary Examiner*—Gilberto Barron, Jr.
*Assistant Examiner*—Aravind K Moorthy (57) ABSTRACT

A system and method is disclosed for storing waveforms on a computer, while ensuring that the waveforms are only used on a signal generator fitted with the correct licensing keys. The system includes one or more signal generation applications for calculating one or more waveforms. Each waveform can be stored on a computer by bundling the waveform, a code that includes license information and any signal generator settings required to configure the signal generator into a single file. The file can further be encrypted for security purposes. Upon receiving a request for the file, a download application associated with the signal generator retrieves the encrypted file, decrypts the file and compares one or more keys stored within the signal generator with the code to determine whether the signal generator is allowed to download the waveform.

28 Claims, 7 Drawing Sheets

SYSTEM AND METHOD FOR SECURE DOWNLOAD OF WAVEFORMS TO SIGNAL GENERATORS

BACKGROUND OF THE INVENTION

1. Technical Field of the Invention

The present invention relates generally to signal generators, and specifically to download of waveforms to signal generators.

2. Description of Related Art

Signal generation test instruments are utilized in the wireless telecommunications industry to aid in the measurement of the quality of signals transmitted and received over wireless transceiver equipment. A signal generation test instrument includes an RF signal generator that is modulated by a waveform generator. The waveform generator uses a composite modulation technique to encode information in both the amplitude and phase of the modulated signal. Specifically, the waveform generator generates digital samples corresponding to the base-band I (in-phase) and Q (quadrature-phase) components. A set of numerical value pairs (I and Q) of the digital samples that are converted into analog form constitutes the waveform. Since the waveform and signal generation test instrument are specifically calibrated and produce a known signal, the signal generation test instrument can use the waveform to perform measurements on the wireless equipment.

Different types of composite modulation techniques are used for different types of communications formats, such as, Code Division Multiple Access (CDMA) and Time Division Multiple Access (TDMA). Therefore, instead of using a different signal generation test instrument for each modulation technique, computer-generated waveforms can be downloaded to a generic signal generation test instrument that is capable of transmitting any type of waveform. For example, the generic signal generation test instrument (hereinafter referred to as a signal generator) can be customized to transmit any type of waveform by taking downloaded I and Q values, converting the I and Q values into analog signals through the use of a digital-to-analog converter and using the analog signals to modulate a carrier (i.e., "play" the waveform).

A user can access signal generation software stored on a computer, and configure one or more waveforms for one or more communications formats. The signal generation software includes a different application for each type of communications format. In addition, each signal generator includes one or more "licensing keys", each being associated with a different application. These licensing keys are purchased from the signal generator provider, and prevent unauthorized use of the software. Upon creation of a particular waveform, the signal generation software within the computer checks the signal generator connected to the computer for the appropriate key prior to downloading the waveform to the signal generator.

The waveforms themselves are not stored on the computer containing the signal generation software or in any other location other than the specific signal generator equipment that the waveform was created for, in order to prevent unauthorized equipment from utilizing the waveforms without purchasing a key. However, by requiring the waveforms be stored directly on the signal generator, many test customers who utilize automatic test equipment systems are not able to implement an automated signal generation solution.

Automatic test equipment (ATE) systems are software-driven, meaning that there is no user-interaction involved. Therefore, ATE systems do not allow a user to manually create a waveform on a computer and download that waveform directly to a signal generator connected to the computer. Instead, ATE systems include software for instructing a signal generator to generate a specific waveform. Therefore, what is needed is a mechanism for storing waveforms on the computer, while maintaining security of the waveforms, in order to provide an ATE solution.

SUMMARY OF THE INVENTION

The present invention provides a system and method for storing waveforms on a computer, while ensuring that the waveforms are only used on a signal generator fitted with the correct licensing keys. The system includes one or more signal generation applications for calculating one or more waveforms. Each waveform can be stored on a computer by bundling the waveform and a code that includes license information into a single file. Upon receiving a request for the file, a download application associated with the signal generator retrieves the file and compares one or more keys stored within the signal generator with the code to determine whether the signal generator is allowed to download the waveform.

In some embodiments, the file is encrypted before being stored on the computer, and the download application decrypts the file prior to checking the code. In further embodiments, the file also includes signal generator settings. The download application uses the signal generator settings to configure the signal generator for the waveform.

Advantageously, the download application enables the waveforms to be controlled by the customer's Automatic Test Equipment (ATE) system, while maintaining security of the waveforms. In addition, the download application can check for any number of different licensing keys, which enables one application to work with all of the different signal generation applications (i.e., different types of modulation techniques). Therefore, an end-user or ATE system need only learn how to interface with one download application in order to download any type of waveform. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS OF THE INVENTION

The numerous innovative teachings of the present application will be described with particular reference to the exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others.

Figure 1:
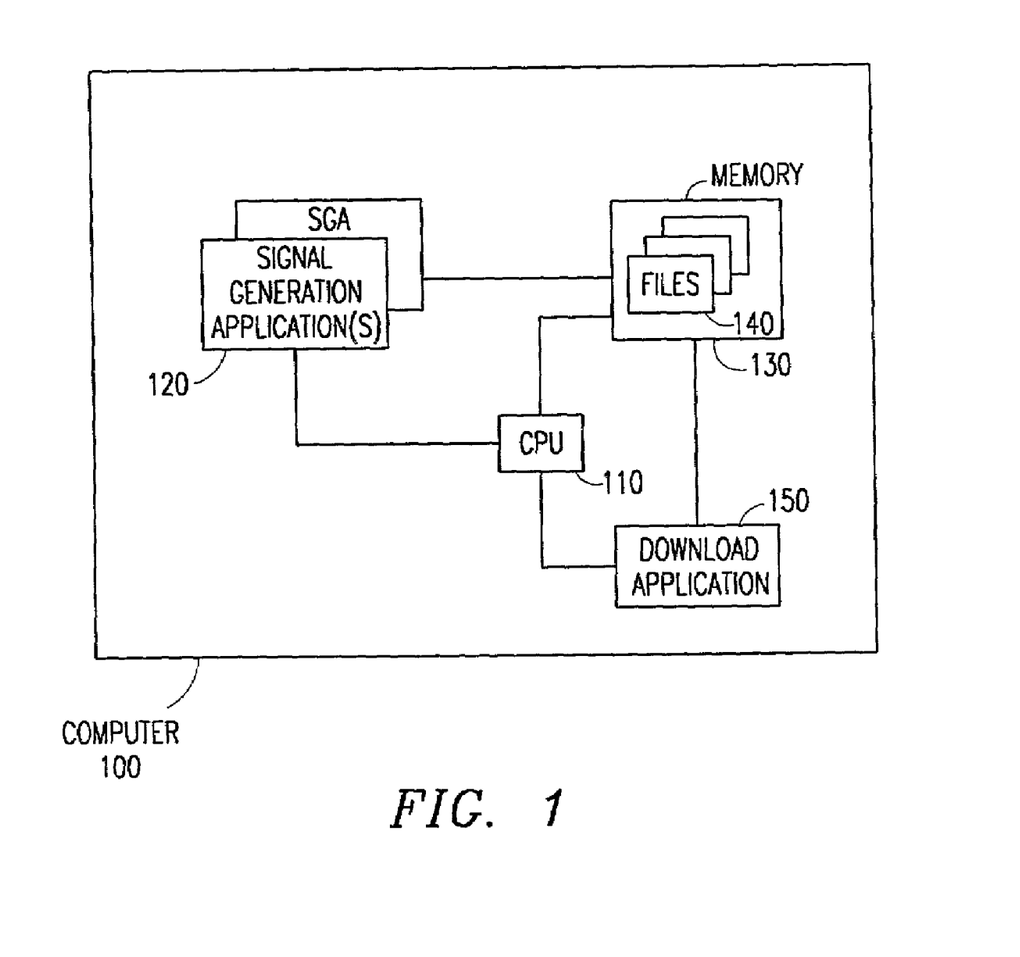
FIG. 1 is a block diagram of the exemplary components of a computer capable of storing and downloading one or more files containing created waveforms.

FIG. 1 is a block diagram of a computer 100 having one or more signal generation applications 120 and a download application 150 therein. The computer 100 can be a personal computer, server or other type of programmable processing device. The signal generation application(s) 120 and download application 150 are tangibly embodied in a computer-readable medium, e.g., a ZIP® drive, floppy disk, hard drive, CD-ROM, non-volatile memory device, tape or any other type of data storage device. The signal generation applications 120 are each associated with a different communications format, e.g., CDMA, TDMA, etc. Each waveform created using one of the signal generation applications 120 is stored as a file 140 within a storage media 130 that is computer-readable or otherwise accessible, such as a memory. The memory 130 may be any memory type, such as, for example, RAM, ROM, EPROM, EEPROM, HDD or FDD, implemented on any data storage device.

The signal generation applications 120 and files 140 can be included on the same computer 100 as the download application 150, or can be stored on a separate computer or a server (not shown). For example, the signal generation applications 120 can be stored on a web server (not shown) and the created files 140 can be downloaded from the web server to the computer 100 storing the download application 150 or to a different computer (not shown) that is accessible by the download application 150 directly or via a data network (e.g., Internet or local area network).

The download application 150 accesses the memory 130 to retrieve one or more files 140 from memory 130 in order to download the waveforms associated with those files 140. A Central Processing Unit (CPU) 110 controls the creation of waveforms by the signal generation applications 120, the storage of files 140 within the memory 130 and the download of waveforms by the download application 150. The CPU 110 may be any microprocessor or microcontroller configured to load and run the signal generation applications 120 and download application 150 and access the memory 130.

Figure 2:
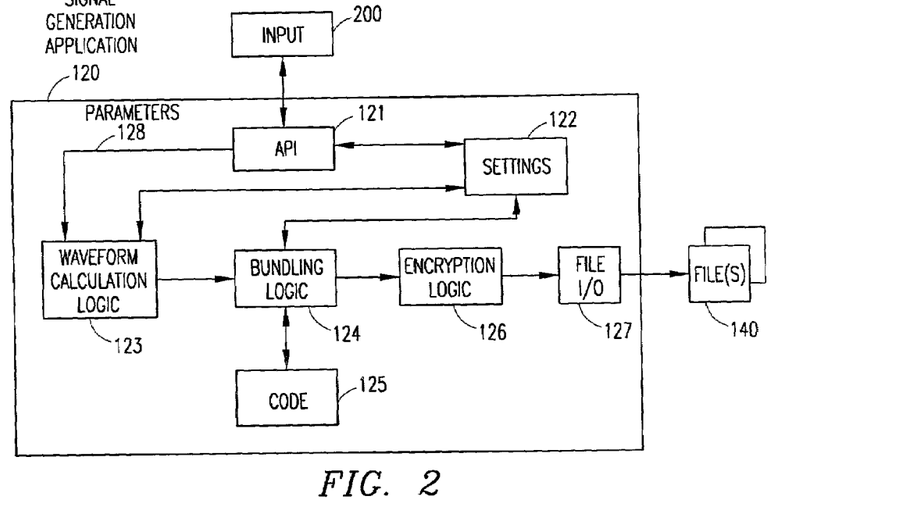
FIG. 2 is an exemplary logical block diagram of the signal generation application shown in FIG. 1.

Referring now to FIG. 2, in order to store the waveforms on the computer, while maintaining security of the waveforms from unauthorized users, the signal generation application 120 includes a code 125. Each signal generation application 120 has a unique code 125 (e.g., licensing key) associated with it. The licensing key is used to allow only those customers who have purchased the licensing key for their signal generators to download waveforms created by the signal generation application 120.

The signal generation application 120 is connected to an input device 200 controlled by a user. The input device 200 is, for example, one or more of a keyboard, mouse, voice command software, touch screen, wireless device (for remote control or access via a wireless network) or remote input system (for access via a data network or another computer). The input device 200 connects to an Application Program Interface (API) 121 within the signal generation application 120 to select or enter various parameters 128 related to the signal generator settings and the characteristics of the desired waveform via a graphical user interface provided by the API 121. The API 121 accesses pre-configured signal generator settings 122 and provides the pre-configured signal generator settings 122 and various input parameters 128 to waveform calculation logic 123, which calculates the parameters of the desired waveform based on the input parameters 128 and pre-configured signal generator settings 122. It should be understood that the term "logic" herein refers to the hardware, software and/or firmware required to perform the functions of the logic.

Figure 3:
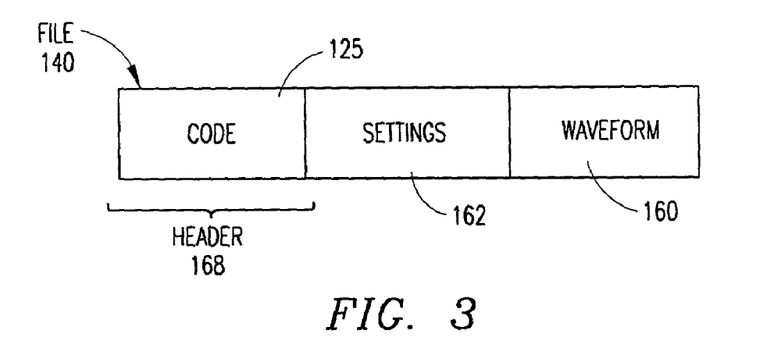
FIG. 3 illustrates the main components of the stored files.

Bundling logic 124 collects and bundles the calculated waveform 160, code 125 for the signal generation application 120 and any signal generator settings 162 to create a file 140 for the waveform 160, as shown in FIG. 3. The file typically also has a header section 168 identifying the format version of the file itself In some embodiments, the code 125 can be included as part of the header 168 for the file 140. Referring again to FIG. 2, the bundled file 140 is passed to encryption logic 126 for encryption of the file 140. The encryption logic 126 can use any encryption algorithm (e.g., bit scrambling) to encrypt the file 140. Although a keyed encryption algorithm may be used, it is not necessary due to the proprietary nature of the encryption algorithm (i.e., no outside sources have a need to access the files 140). The encrypted files 140 containing the calculated waveforms are passed to the memory (shown in FIG. 1) for storage via a File input/output (I/O) 127.

Figure 4:
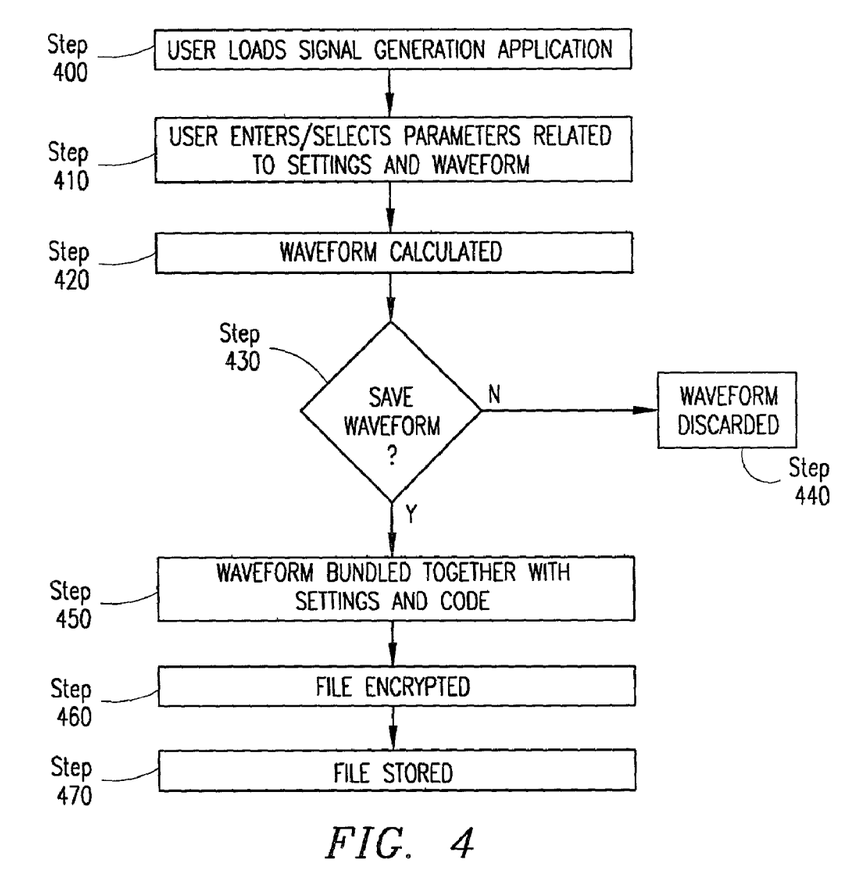
FIG. 4 is a flow chart illustrating the exemplary steps for creating and storing the waveforms.

FIG. 4 illustrates the exemplary steps for creating and storing the waveforms. Initially, a user requests that one of the signal generation applications be loaded and run (step 400). Thereafter, the selected signal generation application solicits various parameters related to signal generator settings and the waveform from the user (step 410). For example, the user can enter parameters into fields provided by the signal generation application. Alternatively, the user can select from one or more pre-configured parameters, such as pre-configured signal generator settings. Based on the parameters provided by the user, the waveform is calculated (step 420).

If the user does not select to save the calculated waveform (step 430), the waveform is discarded (step 440). However, if the user does select to save the waveform, the waveform is bundled together with the signal generator settings and code for the selected signal generation application as a file (step 450). Thereafter, the file is encrypted (step 460) and stored on the computer (step 470).

Figure 5:
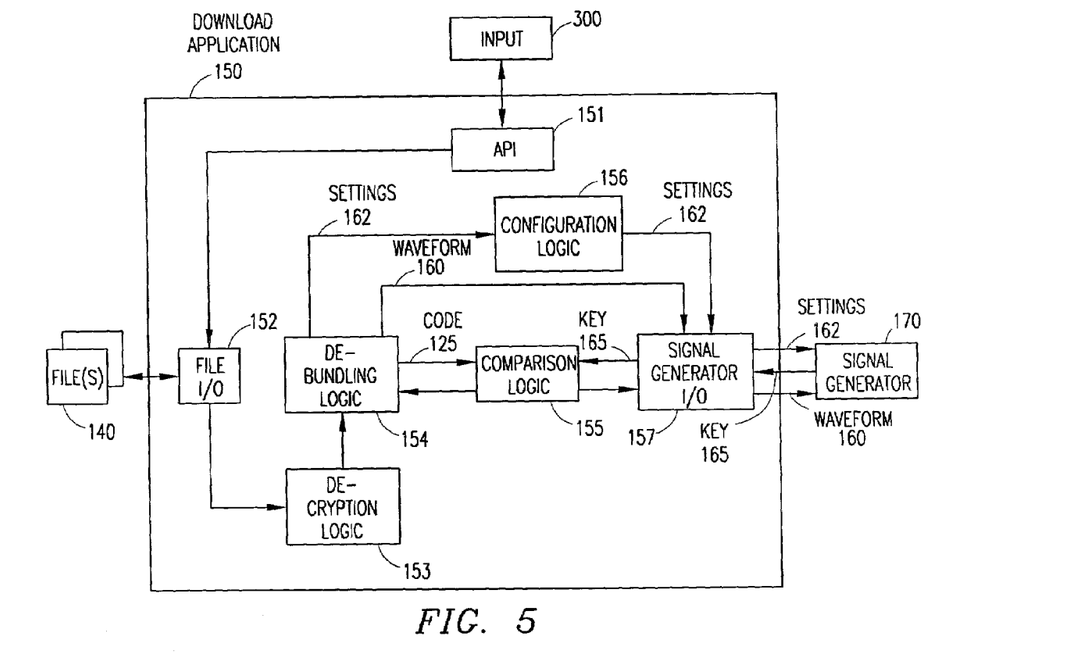
FIG. 5 is an exemplary logical block diagram of the download application shown in FIG. 1.

To later download the encrypted file, a download application of the type shown in FIG. 5 is used. The download application 150 is also connected to an input device 300 controlled by a user or another software application. The input device 300 can be, for example, a keyboard, voice command software, touch screen, wireless device (for remote control or access via a wireless network), remote input system (for access via a data network or another computer) or another software application, such as an Automatic Test Equipment (ATE) software application. The input device 300 connects to an Application Program Interface (API) 151 within the download application 150 to request that one or more waveforms be downloaded to one or more signal generators 170.

The API 151 passes the request for a waveform to a File I/O 152, which accesses the memory (shown in FIG. 1) to retrieve the encrypted file 140 containing the requested waveform. The File I/O 152 passes the retrieved encrypted file 140 to decryption logic 153, which decrypts the encrypted file 140 and transmits the decrypted file 140 to de-bundling logic 154. The de-bundling logic 154 separates the file into it's constituent parts: (1) waveform 160; (2) signal generator settings 162; and (3) code 125.

Before downloading the waveform 160 to the signal generator 170, the de-bundling logic 154 passes the code 125 to comparison logic 155, which retrieves one or more keys 165 (i.e., licensing keys) from the signal generator 170 via a signal generator I/O 157. The comparison logic 155 compares the code 125 with the one or more keys 165 to determine whether the code 125 matches any of the keys 165. If the code 125 matches one of the keys 165, the de-bundling logic 155 transmits the signal generator settings 162 to signal generator configuration logic 156, which uses the signal generator settings 162 to configure the signal generator 170 for the waveform 160 via the signal generator I/O 157. The de-bundling logic 154 also transmits the waveform 160 to the signal generator I/O 157 for downloading to the configured signal generator 170.

Figure 6:
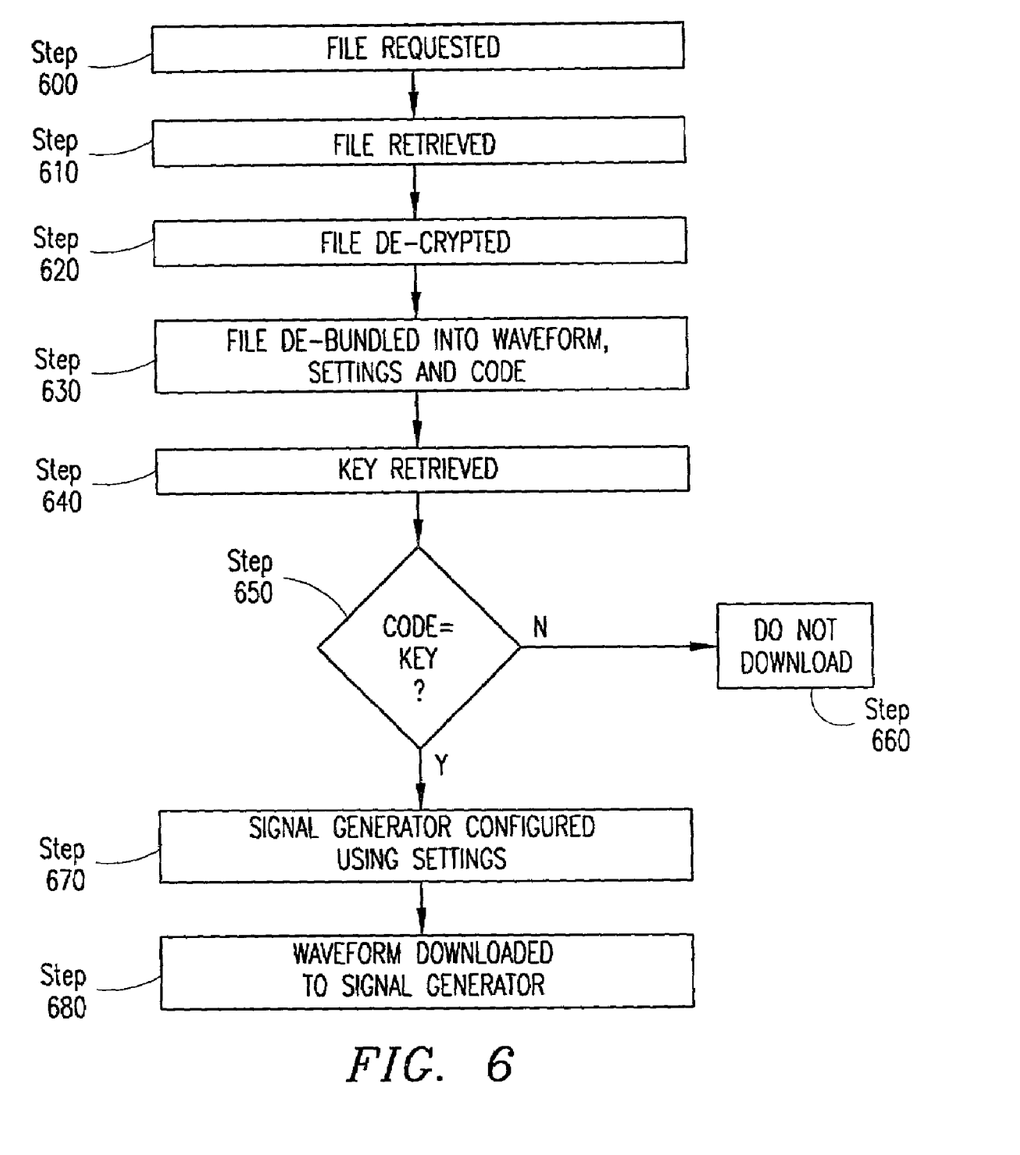
FIG. 6 is a flow chart illustrating the exemplary steps for downloading the stored waveforms.

FIG. 6 illustrates the exemplary steps for downloading stored waveforms to a signal generator. Initially, a user or another software application requests that a waveform be downloaded to a particular signal generator (step 600). Thereafter, the encrypted file containing the requested waveform is retrieved (step 610), decrypted (step 620) and de-bundled (step 630) in order to extract the waveform, signal generator settings and code associated with the waveform.

One or more keys that are stored within the signal generator are retrieved (step 640) and compared with the code to determine whether the code matches any of the keys associated with the signal generator (step 650). If not, the waveform is not downloaded to the signal generator (step 660). If so, the signal generator is configured using the signal generator settings (step 670) and the waveform is downloaded to the signal generator (step 680).

Figure 7:
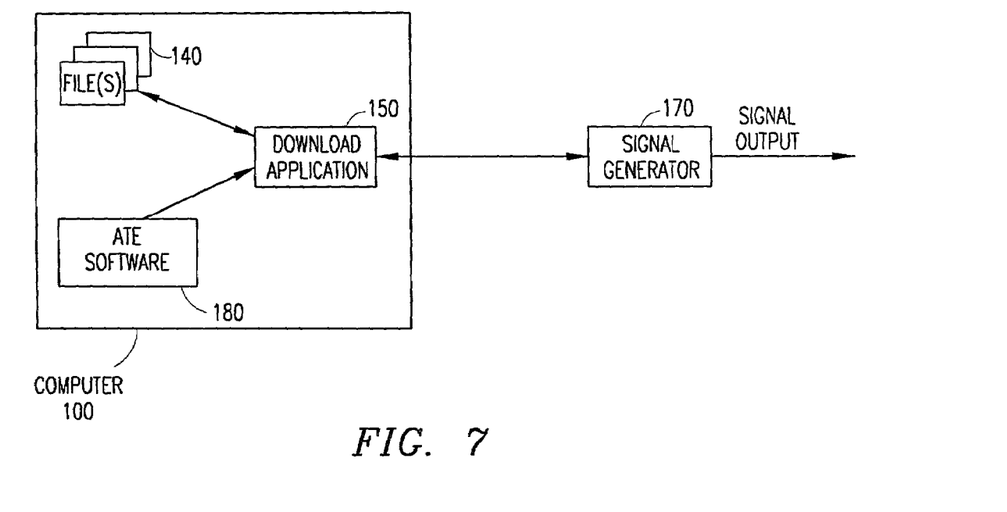
FIG. 7 illustrates the use of automatic test equipment to download a waveform to a signal generator.
Figure 8:
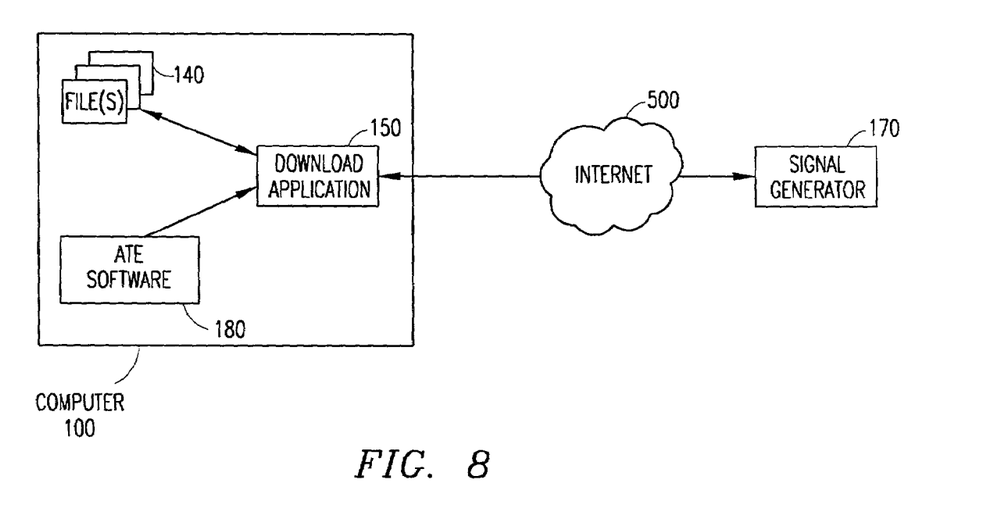
FIG. 8 illustrates the ability to download the waveform to a signal generator via the Internet.

FIGS. 7-11 illustrate an automatic test equipment (ATE) system including at least an ATE software application 180 for downloading a waveform to a signal generator 170. As shown in FIG. 7, an automatic test equipment (ATE) software application 180 can be included on the computer 100 containing at least the files 140 and the download application 150. The ATE software application 180 is configured to transmit a request for a waveform to the download application 150, which retrieves the file 140 containing the requested waveform, checks the licensing key, configures the signal generator using the signal generator settings and downloads the waveform to the signal generator 170. The signal generator 170, in turn, "plays" the waveform, to produce a signal at the output of the signal generator 170. The computer 100 containing the download application 150 can be connected directly to the signal generator 170, or as shown in FIG. 8, the computer 100 can be connected to the signal generator 170 indirectly via the Internet 500 or another data network, such as a local area network.

Figure 9:
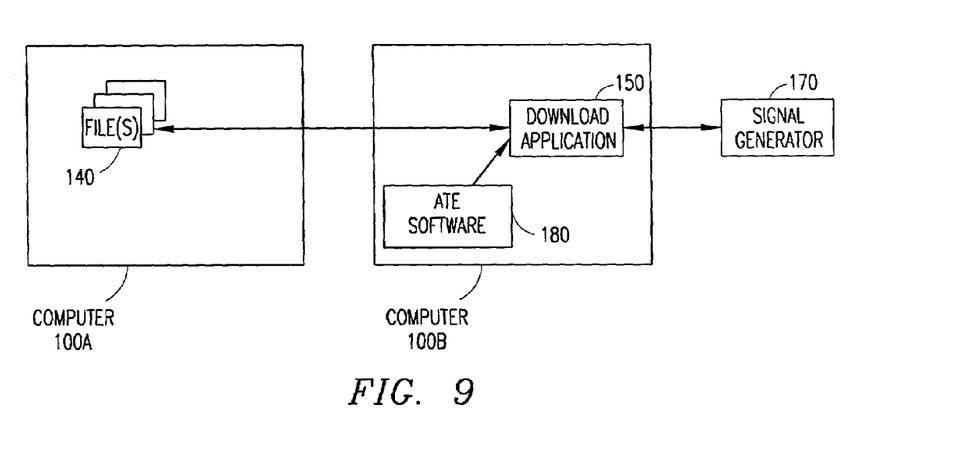
FIG. 9 illustrates remote storage of the files.

As shown in FIG. 9, the files 140 can be stored remotely on a different computer (computer 100A) than the computer (computer 100B) that stores the download application and ATE software. Computer 100B can be directly connected to computer 100A or indirectly connected via one or more additional computers (not shown) or via a data network (not shown). In addition, although not shown, the files 140 can be permanently stored on computer 100A and copies of the files 140 can be transferred to computer 100B that stores the download application 150 in order to more efficiently download the waveforms to the signal generator 170.

Figure 10:
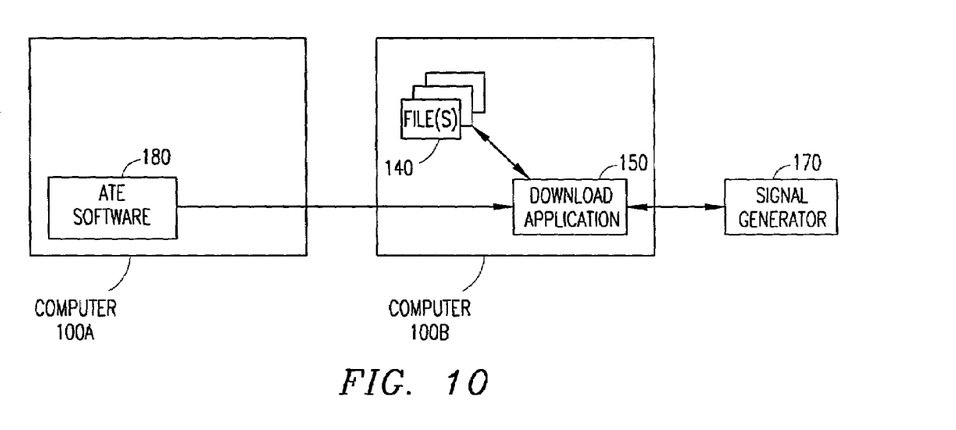
FIG. 10 illustrates remote automatic test equipment control of the download application.

FIG. 10 illustrates remote automatic test equipment control of the download application 150. In FIG. 10, the ATE software application 180 is located on a different computer (computer 100A) than the computer (computer 100B) that stores the download application 150 and files 140, thereby enabling remote control of the downloading of the waveforms to the signal generator 170. As with FIG. 9, computer 100B can be connected directly to computer 100A or indirectly via one or more additional computers (not shown) or via a data network (not shown).

Figure 11:
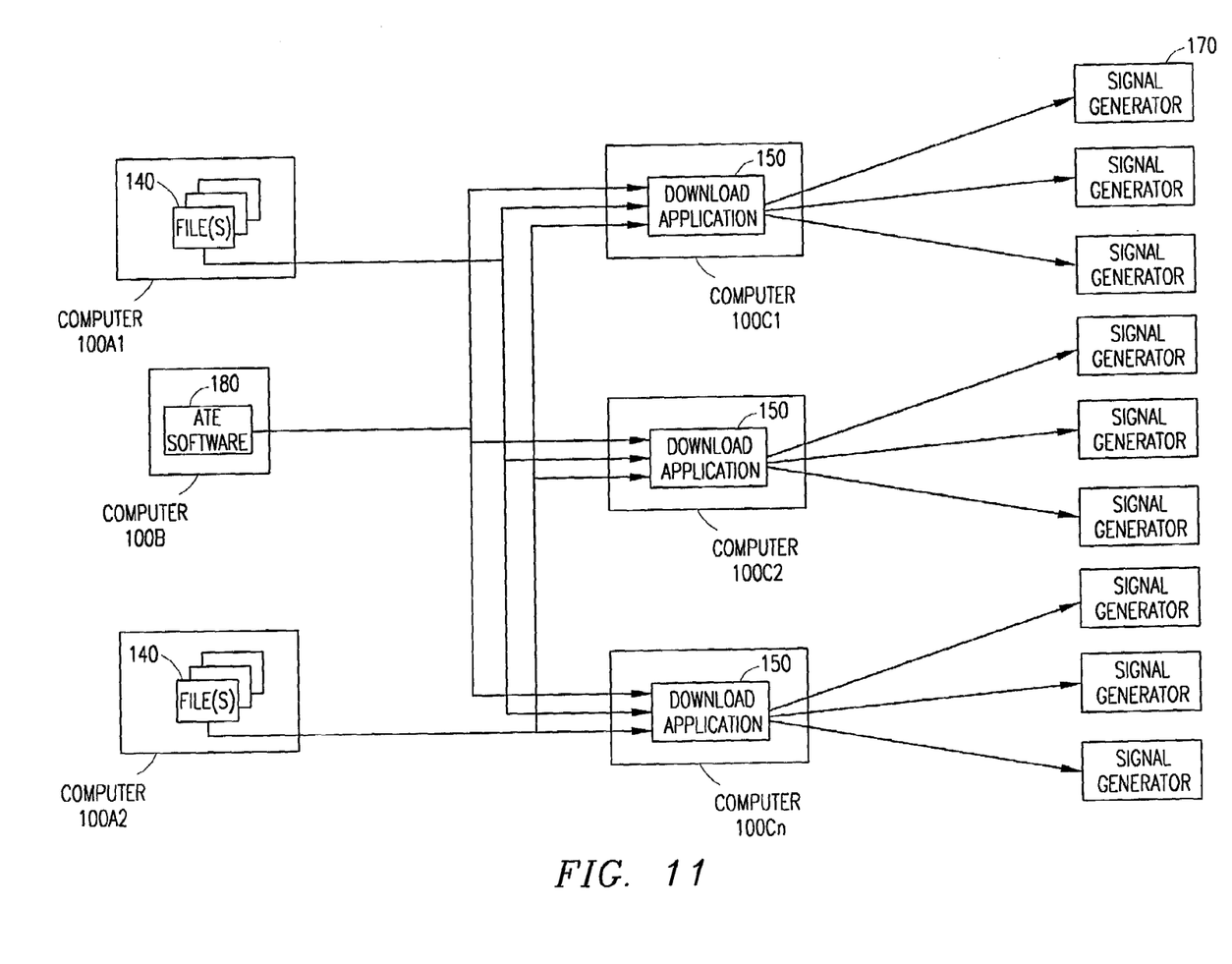
FIG. 11 illustrates remote automatic test equipment control of the download of files from multiple storage facilities to multiple download applications and multiple signal generators.

FIG. 11 illustrates remote automatic test equipment control of the download of files 140 from multiple storage facilities to multiple download applications 150 and multiple signal generators 170. In FIG. 11, the files 140, ATE software application 180 and download application(s) 150 are all located on different computers. For example, the files 140 can be located on two or more computers 100A1 and 100A2 for redundancy or increased storage space. In addition, the ATE software application 180 can be located on a remote computer 100B in order to control multiple download applications 150 located on multiple computers 100C1, 100C2, . . . , 100C*n*, each being connected to one or more signal generators 170.

Each of the download applications 150 preferably has access to each of the computers 100A1 and 100A2 storing the files 140, although each download application 150 may have a dedicated computer 100A1 or 100A2. In addition, although not shown, there may be multiple ATE software applications 180 on one or more computers 100B for controlling the multiple download applications 150 (e.g., on a one-to-one basis or each ATE software application 180 may control all of the download applications 150).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

I claim:

1. A waveform customization method for a signal generator, comprising:
    retrieving a waveform and at least one code associated with said waveform from a storage media;
    retrieving at least one key associated with said signal generator;
    comparing said at least one code associated with said waveform and said at least one key; and
    downloading said waveform to said signal generator under condition that said at least one code matches said at least one key.

2. The method of claim 1, further comprising:
    bundling said waveform and said at least one code associated with said waveform into a file; and
    storing said file containing said waveform and said at least one code associated with said waveform in said storage media.

3. The method of claim 2, further comprising:
providing one or more parameters that characterize said waveform; and
creating said waveform based on said one or more parameters.

4. The method of claim 3, further comprising:
providing one or more signal generator settings;
bundling said one or more signal generator settings with said waveform and said at least one code; and
configuring said signal generator using said one more signal generator settings.

5. The method of claim 4, wherein said steps of providing further comprises:
entering at least one of said one or more parameters and said one or more signal generator settings by a user into a computer that creates said waveform.

6. The method of claim 5, wherein said step of providing said one or more signal generator settings further comprises:
pre-configuring said one or more signal generator settings; and
storing said one or more pre-configured signal generator settings on said computer.

7. The method of claim 2, wherein said file is encrypted, and further comprising:
decrypting said file after said step of retrieving said waveform.

8. The method of claim 1, wherein said step of retrieving said at least one key further comprises:
retrieving said at least one key from said signal generator, said at least one key being stored within said signal generator.

9. The method of claim 1, wherein said waveform is a signal modulated to conform to one of a plurality of communication formats, said signal generator being capable of downloading and transmitting signals modulated to conform to any of the plurality of communication formats, each of the plurality of communication formats having a different one of said at least one code associated therewith.

10. The method of claim 1, further comprising:
requesting said waveform be downloaded to said signal generator by an automatic test equipment system.

11. The method of claim 10, further comprising:
requesting an additional waveform be downloaded to an additional signal generator by said automatic test equipment system.

12. The method of claim 11, wherein said additional waveform is stored within an additional storage media.

13. A system customizing at least one waveform of a signal generator, comprising:
a storage media adapted to store a waveform and at least one code associated with said waveform; and
a download application configured to retrieve said waveform and at least one key associated with said signal generator, compare said at least one code associated with said waveform and said at least one key and download said waveform to said signal generator under condition that said at least one code matches said at least one key.

14. The system of claim 13, further comprising:
a signal generation application configured to bundle said waveform and said at least one code associated with said waveform into a file and store said file in said storage media.

15. The system of claim 14, wherein said signal generation application is further configured to encrypt said file prior to storing said file in said storage media, said download application being further configured to decrypt said file.

16. The system of claim 14, wherein said signal generation application is further configured to receive as input one or more parameters that characterize said waveform and create said waveform based on said one or more parameters.

17. The system of claim 16, wherein said signal generation application is further configured to provide one or more signal generator settings and bundle said one or more signal generator settings with said waveform and said at least one code, said download application being further configured to use said one or more signal generator settings to configure said signal generator.

18. The method of claim 17, further comprising:
a computer having at least said signal generation application therein, said signal generation application further having an interface capable of receiving at least one of said one or more parameters and said one or more signal generator settings from a user of said computer.

19. The system of claim 18, wherein said one or more signal generator settings are pre-configured and stored on said computer.

20. The system of claim 18, wherein said computer further has said storage media and said download application therein.

21. The system of claim 18, further comprising an additional computer having at least said download application therein.

22. The system of claim 21, wherein said computer is operatively connected to said additional computer.

23. The system of claim 22, wherein said computer is connected to said additional computer via a data network.

24. The system of claim 13, wherein said at least one key is stored on said signal generator.

25. The system of claim 13, wherein said waveform is a signal modulated to conform to one of a plurality of communication formats, said signal generator being capable of downloading and transmitting signals modulated to conform to any of the plurality of communication formats, each of the plurality of communication formats having a different one of said at least one code associated therewith.

26. A system customizing at least one waveform of a signal generator, comprising:
a storage media adapted to store a waveform and at least one code associated with said waveform;
a download application configured to retrieve said waveform and at least one key associated with said signal generator, compare said at least one code associated with said waveform and said at least one key and download said waveform to said signal generator under condition that said at least one code matches said at least one key; and
an automatic test equipment system adapted to request said download application to download said waveform to said signal generator.

27. The system of claim 26, wherein said automatic test equipment system is further configured to request an additional waveform be downloaded to an additional signal generator.

28. The system of claim 27, further comprising:
an additional storage media, said additional waveform being stored within said additional storage media.

* * * * *